Dec. 16, 1947.   J. V. L. PEACOCK   2,432,675
VEHICLE WHEEL
Filed April 6, 1945
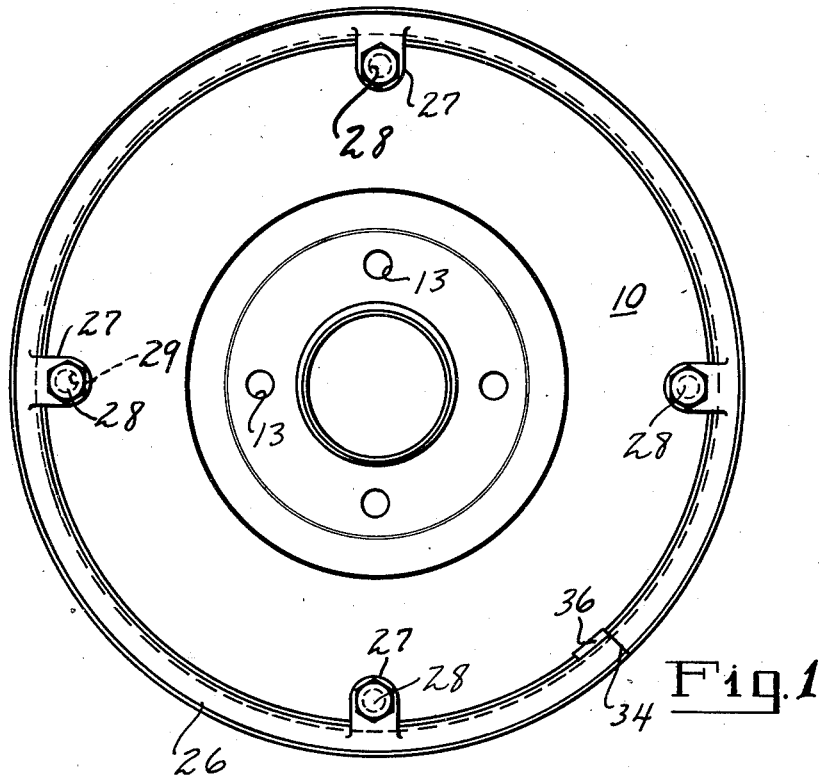
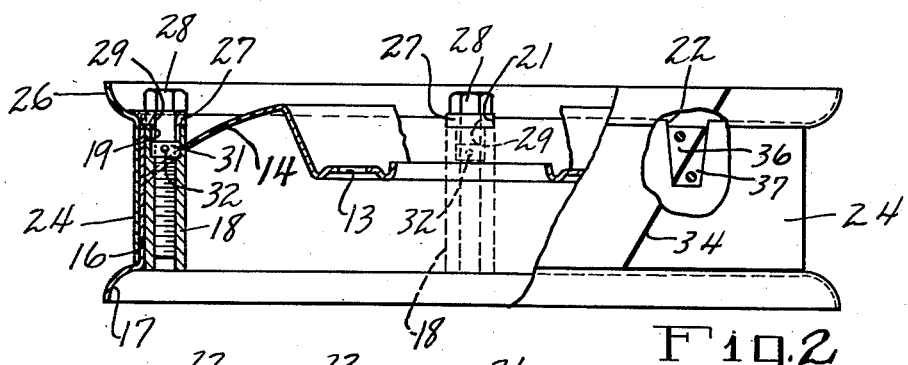
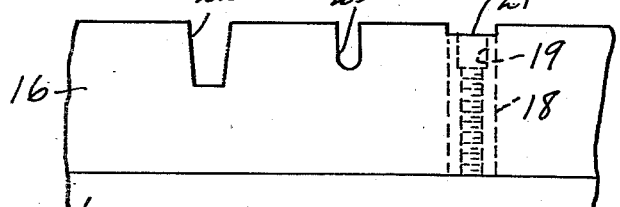
INVENTOR.
James V. L. Peacock
BY
Henry L. Jennings
ATTORNEY Patented Dec. 16, 1947

2,432,675

UNITED STATES PATENT OFFICE 2,432,675

VEHICLE WHEEL

James V. L. Peacock, Columbus, Ga.

Application April 6, 1945, Serial No. 586,959

4 Claims. (Cl. 152—411)

This invention relates to vehicle wheels having pneumatic tires, and has for an object to provide a wheel of the character designated with a separable rim which shall be simple of design, sturdy of construction, and in which the parts are held firmly against relative, noise making motion.

A further object of my invention is to provide a vehicle wheel with a separable, telescoping rim having wedging, interlocking parts which hold the parts of the rim firmly against relative motion.

A still further object of my invention is to provide a vehicle wheel with a separable, telescoping rim in which the outer ring of the rim is cut across the tread.

Another object of my invention is to provide a vehicle wheel with outer and inner rings telescoping to form a rim, together with securing means for the separable parts which shall be adapted to force the parts away from each other when demounting tires from the rim.

As is well known in the art to which my invention relates, the mounting and removal of tires, especially heavy, multiple ply tires from vehicle wheels having fixed, drop center rims is an exceedingly laborious operation and one which involves considerable danger of damage to the beads of the tires. This is especially true of vehicles hauling heavy loads, the tires of which, after considerable service, become semi-vulcanized to the rims and require a great deal of force to remove them. Wheels have heretofore been proposed having one rim removable, but such wheels leave the tire mounted on a fixed rim which cannot be contracted and where the tire is stuck to the rim it still has to be forced off.

Briefly, my invention comprises a wheel of the well known steel disk type in which the separable rim comprises an inner ring having a tire retaining flange on one side thereof, which inner ring is fixedly secured to the wheel. Telescoping over the inner ring is an outer ring having a tire retaining flange on the side opposite the flange of the inner ring, which outer ring is split across the tread so that it may be contracted when removed from the outer ring. The two rings are held together by means of spaced bolts, mounted in lugs carried by the outer ring and which are screwed into threaded sleeves carried by the inner ring. The lugs on the outer ring bottom against the sleeves on the inner ring when the two parts are fastened together and the sleeves are provided with counterbores in which collars carried by the bolt fit. Thus when separating the inner and outer rings, the collars coact with the lugs to force the two rings apart. Also carried by the outer ring are wedge shaped lugs fitting into corresponding notches on the inner ring whereby the outer and inner rings are drawn tightly together when being assembled. I thus provide a separable rim structure for vehicle wheels which is extremely sturdy, does not embody unnecessary weight, and one in which the parts are held firmly against relative movement.

Apparatus embodying features of my invention is illustrated in the accompanying drawing, forming a part of this application, in which Fig. 1 is a side elevational view of a vehicle wheel and assembled, separable rim;

Fig. 2 is a view taken at right angles to Fig. 1, partly in section; and

Fig. 3 is a fragmentary view of the inner ring, showing the notches for interlocking with the lugs carried by the outer ring.

Referring now to the drawings for a better understanding of my invention, I show in Fig. 1 a vehicle wheel 10 which is of the well known, steel disk type, having bolt holes 13 therein for attaching it to the hub of a vehicle hub, not shown. The wheel 10 is provided with an outer flange 14 to which is secured by riveting, or otherwise, the inner ring 16 of my improved separable rim assembly. The inner ring 16 of the separable rim is provided on one side with a flange 17 adapted to bear against the bead of a tire. Secured to the inner ring 16, at regular intervals, are a plurality of sleeves 18 which are threaded for the major portion of their length but which are provided with counterbores 19 at the ends thereof opposite the flange 17. The inner ring 16 is also provided with relatively shallow notches 21 in the side at the ends of the sleeves 18, as shown in Fig. 3. A further relatively deep tapered notch 22 is provided in the ring for a purpose to be described more particularly hereinafter. There is also provided a notch 23 along the side opposite the flange 17 which is adapted to receive the valve stem of the pneumatic tube, not shown.

Telescoping over the inner, relatively thick rim 16 is an outer, removable rim 24 which has a flange 26 adapted to bear against the bead of the tire on the opposite side from the flange 17. The outer ring 24 has mounted thereon a plurality of lugs 27 which fit into the relatively shallow notches 21 in the inner ring 16 and which bear against the ends of the sleeves 18 when the rim is assembled. Mounted in the lugs 27 are bolts 28 which pass through holes 29 in the lugs and which are provided on the inner sides thereof with collars 31 spaced from the lugs, which collars may be secured to the lugs by means of pins 32. The bolts 28, as may be seen in Fig. 2, screw into the threaded portion of the sleeves 18 and the lugs 27 bear against the ends of the sleeves 18 when the bolts are tightened down, thereby clamping the inner and outer rings securely together and holding them against relative movement. When disassembling the rim, the bolts 28 are unscrewed and the collars 31 engage with the lugs 27 to pull the outer ring off of the inner ring.

In order to aid in the assembly and disassembly of the rings forming my improved separable rim, I part the outer ring 24 across the tread and flange, as shown at 34, and secure to the meeting ends thereof complementary wedge pieces 36 and 37, on the inner side of the ring, which together fit into the tapered notch 22 of the inner ring 16, whereby when the outer ring is drawn over the inner ring by means of the bolts 28, the sides of the wedge pieces 36 and 37, engage in the sides of the notch 22 and draw the ends of the ring 24 closely together.

By parting the outer ring 24, as just described, I am enabled to contract it after it is removed from the inner ring 16 by means of any suitable tool not shown. When the ring 24 is contracted, it is then easy to remove a tire therefrom.

It will be seen from the foregoing that I have provided a vehicle wheel with a separable, telescoping rim which is extremely sturdy and simple of construction and by means of which tires may be readily mounted and removed without damage thereto and without the use of heavy tools.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. In a vehicle wheel, a separable rim comprising an inner ring fixed to the body of the wheel and having a tire retaining flange on one side thereof and provided with a plurality of spaced rectangular notches and one relatively deep tapered notch in the edge thereof opposite the flange, an outer ring telescoping over the inner ring and having a tire retaining flange opposite that of the inner ring, said outer ring being parted transversely where it fits over the relatively deep notch in the inner ring, lugs on the outer ring fitting in the spaced notches, complementary wedge shaped lugs carried by the meeting ends of the outer ring and fitting in the tapered notch, and bolts passing through the lugs for fastening the rings together with the lugs fitting in the notches.

2. In a vehicle wheel, a separable rim comprising an inner ring fixed to the body of the wheel and having a tire retaining flange on one side thereof, and provided with a plurality of spaced rectangular notches and one relatively deep tapered notch in the edge thereof opposite the flange, an outer ring telescoping over the inner ring and having a tire retaining flange opposite that of the inner ring, said outer ring being parted transversely where it fits over the relatively deep notch in the inner ring, lugs on the outer ring fitting in the spaced notches, complementary wedge shaped lugs carried by the meeting ends of the outer ring and fitting in the tapered notch, threaded sleeves mounted on the inner ring adjoining the rectangular notches and bearing against the lugs when the rim is assembled, and bolts passing through the lugs and threaded into said sleeves for joining the rings together and drawing the lugs against the sleeves.

3. A wheel as set forth in claim 2 in which the sleeves are counterbored adjacent the lugs, and the bolts pass through the lugs into the sleeves and are provided with collars which fit into the counterbores in spaced relation to the lugs and are adapted to engage the lugs when the rims are being separated.

4. In a vehicle wheel, a separable rim comprising inner and outer telescoping rings, threaded sleeves mounted at spaced intervals on the inner ring and extending transversely thereof, notches provided in one side of the inner ring adjacent the ends of the sleeves, lugs on the outer ring fitting into the notches, bolts extending through the lugs and screwed into the sleeves to hold the rings together, collars carried by the bolts inwardly of the lugs and in spaced relation thereto to engage the lugs and separate the rings when the bolts are being unscrewed, said outer ring being parted at a point between two of said lugs, and wedging lugs on the ends of the parted outer ring fitting into a flaring socket provided in the inner ring to draw the ends together when the rings are assembled.

JAMES V. L. PEACOCK.

REFERENCES CITED

The following references are of record in the file of this patent:

UNITED STATES PATENTS

| Number | Name | Date |
| --- | --- | --- |
| 2,145,525 | Pedro | Jan. 31, 1939 |
| 2,249,568 | Shinliver | July 15, 1941 |
| 1,282,457 | Altmanns | Oct. 22, 1918 |
| 1,675,488 | Goodkowitz | July 3, 1928 |
| 2,367,823 | Brink | Jan. 23, 1945 |

FOREIGN PATENTS

| Number | Country | Date |
| --- | --- | --- |
| 137,731 | Great Britain | 1920 |